(12) United States Patent
Lerman et al.

(10) Patent No.: US 10,146,002 B2
(45) Date of Patent: Dec. 4, 2018

(54) LUMINAIRE WITH OPTICAL MODIFIER

(71) Applicant: Quarkstar LLC, Las Vegas, NV (US)

(72) Inventors: Louis Lerman, Las Vegas, NV (US);
Allan Brent York, Langley (CA);
Ferdinand Schinagl, North Vancouver (CA); Wilson Dau, Victoria (CA);
Hans Peter Stormberg, Stolberg (DE)

(73) Assignee: Quarkstar LLC, Las Vegas, NV (US)

( * ) Notice: Subject to any disclaimer, the term of this patent is extended or adjusted under 35 U.S.C. 154(b) by 116 days.

(21) Appl. No.: 15/022,552

(22) PCT Filed: Sep. 17, 2014

(86) PCT No.: PCT/US2014/056160
§ 371 (c)(1),
(2) Date: Mar. 16, 2016

(87) PCT Pub. No.: WO2015/042188
PCT Pub. Date: Mar. 26, 2015

(65) Prior Publication Data
US 2016/0230956 A1 Aug. 11, 2016

Related U.S. Application Data

(60) Provisional application No. 61/878,764, filed on Sep. 17, 2013.

(51) Int. Cl.
*F21V 7/04* (2006.01)
*F21V 8/00* (2006.01)
(Continued)

(52) U.S. Cl.
CPC .............. *G02B 6/0055* (2013.01); *F21K 9/61* (2016.08); *F21S 8/026* (2013.01); *F21V 7/0016* (2013.01);
(Continued)

(58) Field of Classification Search
CPC .......... F21K 9/61; F21S 8/026; F21V 7/0016; F21V 7/0025; F21V 7/0091; F21V 13/02;
(Continued)

(56) References Cited

U.S. PATENT DOCUMENTS 8,068,707 B1 11/2011 Simon
2003/0117798 A1 6/2003 Leysath
(Continued)

FOREIGN PATENT DOCUMENTS

EP 2196725 A1 6/2010
EP 2163701 B1 4/2015
WO WO2005090854 A1 9/2005

OTHER PUBLICATIONS

International Application No. PCT/US2015/059513, Notification of Transmittal of the International Search Report and the Written Opinion of the International Searching Authority, dated Mar. 31, 2016, 21 pages.
(Continued)

*Primary Examiner* — Jason Moon Han
(74) *Attorney, Agent, or Firm* — Fish & Richardson P.C.

(57) ABSTRACT

The present technology relates to luminaires including light-emitting elements (LEEs), a luminaire module, and at least one optical modifier, where the optical modifier is arranged relative to the luminaire module to receive a fraction of light emitted by the LEEs.

19 Claims, 10 Drawing Sheets

(51) Int. Cl.
*F21V 7/00* (2006.01)
*F21K 9/61* (2016.01)
*G02B 19/00* (2006.01)
*F21S 8/02* (2006.01)
*F21Y 101/00* (2016.01)
*F21Y 103/10* (2016.01)
*F21Y 115/10* (2016.01)

(52) U.S. Cl.
CPC ............ *F21V 7/0091* (2013.01); *G02B 6/005* (2013.01); *G02B 6/0023* (2013.01); *G02B 6/0031* (2013.01); *G02B 6/0035* (2013.01); *G02B 6/0045* (2013.01); *G02B 6/0046* (2013.01); *G02B 6/0085* (2013.01); *G02B 6/0096* (2013.01); *G02B 19/00* (2013.01); *F21Y 2101/00* (2013.01); *F21Y 2103/10* (2016.08); *F21Y 2115/10* (2016.08)

(58) Field of Classification Search
CPC ....... F21V 13/04; F21V 13/12; G02B 6/0023; G02B 6/0031; G02B 6/0035; G02B 6/0045; G02B 6/0046; G02B 6/005; G02B 6/0055; G02B 6/0085; G02B 6/0096; G02B 19/00
USPC .................. 362/602, 606–612, 615–616, 628
See application file for complete search history.

(56) References Cited

U.S. PATENT DOCUMENTS

| | | |
|---|---|---|
| 2008/0192458 A1 | 8/2008 | Li |
| 2009/0201698 A1 | 8/2009 | Klick |
| 2009/0316414 A1 | 12/2009 | Yang |
| 2013/0201715 A1 | 8/2013 | Dau |

OTHER PUBLICATIONS

Notification of Transmittal of the International Search Report and the Written Opinion of the International Searching Authority, International Application No. PCT/US2014/056160, dated Jan. 7, 2015, 10 pages.

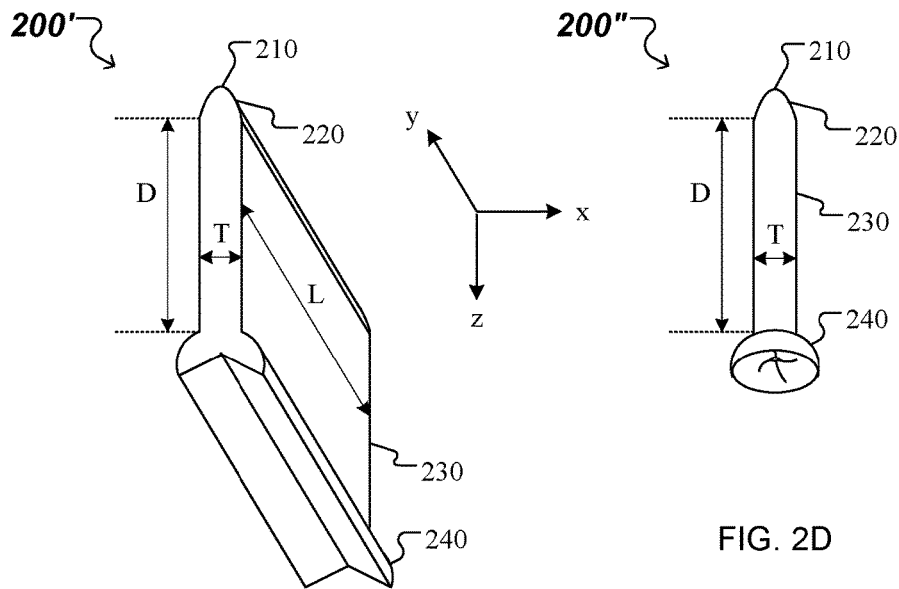
FIG. 2C
FIG. 2D
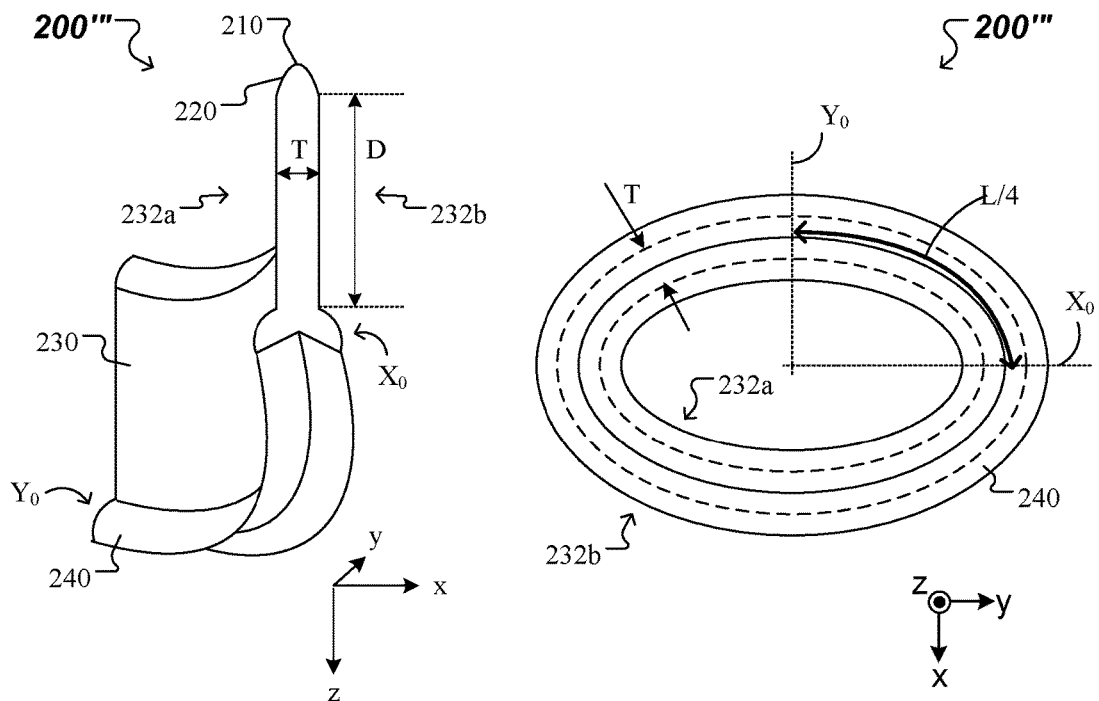
FIG. 2E
FIG. 2F

LUMINAIRE WITH OPTICAL MODIFIER

CROSS-REFERENCE TO RELATED APPLICATION

This application is a U.S. National Stage of International Application No. PCT/US2014/056160, filed Sep. 17, 2014, which claims benefit under 35 U.S.C. § 119(e)(1) to U.S. Provisional Application No. 61/878,764, filed on Sep. 17, 2013, the entire contents of which are incorporated by reference herein.

TECHNICAL FIELD

Technologies related solid-state luminaires and in particular to solid-state luminaires with optical modifiers to redirect light that is output by light-emitting elements are described herein.

BACKGROUND

Conventional lighting systems in the lighting field commonly harness fairly spatially homogeneous sources within optical systems. The light sources are often fairly bright (source luminance), and the conventional lighting systems are often provided with a single reflector system to collect the light flux and direct it in a semi-controlled fashion, or via secondary reflector/diffuser systems, towards a target area. Conventional lighting systems often retain a Lambertian diffuser/reflective surface in the system such that a direct view of the Lambertian source is retained in at least one field of view. This gives rise, at certain angles, to glare with the problem increasing in time with ever brighter Light Emitting Diode (LED) sources.

SUMMARY

The present technology relates generally to solid-state luminaires and in particular to solid-state luminaires with optical modifiers to redirect light that is output by light-emitting elements.

A variety of luminaires are disclosed that are configured to manipulate light provided by one or more light-emitting elements (LEEs). The components of the luminaire can be configured in a variety of ways so a variety of intensity distributions can be output by the luminaire. Such luminaires can be configured to provide light for particular lighting applications, including office lighting, task lighting, cabinet lighting, garage lighting, wall wash, stack lighting, and down-lighting.

Accordingly, various aspects of the invention are summarized as follows.

In general, in a first aspect, the invention features a luminaire including one or more luminaire modules, each module including: one or more light-emitting elements (LEEs) disposed on one or more substrates and adapted to emit light in an emission angular range; an optical extractor adapted to receive a portion of light emitted by the one or more LEEs within the emission angular range along a forward direction, the optical extractor having a first redirecting surface, the first redirecting surface of the optical extractor being adapted to reflect at least a portion of the light received at the optical extractor and provide redirected light in a first backward direction opposing the forward direction; and a first optical modifier adapted to receive a first fraction of the light that is emitted by the one or more LEEs in the emission angular range along a first lateral direction, the first optical modifier having one or more reflective surfaces shaped to output the received light along the first lateral direction.

The foregoing and other embodiments can each optionally include one or more of the following features, alone or in combination. In some implementations the luminaire can further include one or more optical couplers positioned to receive a portion of the light emitted by corresponding one or more LEEs in the emission angular range along the forward direction and adapted to at least partially collimate the received portion of the light and provide the collimated light to the optical extractor. In some implementations, the luminaire can further include a second optical modifier, where the second optical modifier can be adapted to receive a second fraction of the light emitted by the one or more LEEs in the emission angular range along a second lateral direction opposing the first lateral direction, the second optical modifier having one or more reflective surfaces shaped to output the received light along the second lateral direction.

In some implementations, at least a portion of the one or more reflective surfaces of at least one of the first or second optical modifiers can be specular reflective. In some implementations, at least one of the first or second optical modifiers comprises a solid material, and at least a portion of the received light can be reflected via TIR. In some implementations, the luminaire can further include a first tertiary optic having a first reflective surface configured to reflect at least a portion of light that is redirected by the optical extractor in the first backward direction, the reflected light being provided along the forward direction. In some implementations, the first tertiary optic can include a second reflective surface opposing the first reflective surface, the second reflective surface can be configured to reflect at least a portion of the light output by the first optical modifier.

In some implementations, at least one of the first or second reflective surfaces of the first tertiary optic can be diffuse reflective. In some implementations, at least one of the first or second reflective surfaces of the first tertiary optic can be specular reflective. In some implementations, at least one of the first or second reflective surfaces of the first tertiary optic can be perforated. In some implementations, at least one of the first or second reflective surfaces of the first tertiary optic can be semi-transparent. In some implementations, the optical extractor can include a second redirecting surface, the second redirecting surface of the optical extractor can be adapted to reflect at least a portion of the light received at the optical extractor and provide redirected light in a second backward direction, where the second backward direction is on an opposite side of an optical axis of the luminaire relative to the first backward direction.

In some implementations, the luminaire can further include a second tertiary optic having a first reflective surface configured to reflect at least a portion of light that is redirected by the optical extractor in the second backward direction, the reflected light being provided along the forward direction. In some implementations, the second tertiary optic can include a second reflective surface opposing the first reflective surface, the second reflective surface can be configured to reflect at least a portion of the light output by the second optical modifier. In some implementations, at least one of the first or second reflective surfaces of the second tertiary optic can be diffuse reflective. In some implementations, at least one of the first or second reflective surfaces of the second tertiary optic can be specular reflective. In some implementations, at least one of the first or second reflective surfaces of the second tertiary optic can be perforated. In some implementations, at least one of the first or second reflective surfaces of the second tertiary optic can be semi-transparent.

In some implementations, the luminaire can further include a light guide having an input end and an output end, and planar side surfaces extending from the input end to the output end, the side surfaces can be shaped to guide light received from the one or more LEEs at the input end of the light guide in the forward direction to the output end of the light guide and provide guided light at the output end of the light guide to the optical extractor. In some implementations, the light guide can include a solid transparent material and the side surfaces can be configured to guide the light via TIR. In some implementations, the light guide can be hollow and the side surfaces can be reflectors configured to guide the light via specular reflection.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIG. 2C is perspective view of another example of an elongated luminaire module with a light guide and an optical extractor.

FIG. 2D is a perspective view of an example of a rotationally symmetric luminaire module with a light guide and a bidirectional optical extractor.

FIGS. 2E-2F are views of an example of an elongated luminaire module with curved light guide and bidirectional optical extractor.

Reference numbers and designations in the various drawings indicate exemplary aspects of implementations of particular features of the present disclosure.

DETAILED DESCRIPTION

The technologies described herein can be implemented as solid-state luminaires. The disclosed technologies can provide a virtual filament with properties that afford very high degrees of both spatial and temporal control within the illuminated environment. The disclosed technologies can harness light emitted by a light-emitting element (e.g., nominally 2π steradian, roughly Lambertian functionalized LED dies or packages with phosphor conversion coatings or plates somewhere in the packaging) by (i) coupling some of the emitted light into a luminaire module that transfers the light flux to a point of the optical structure that is remote from the light-emitting element where the transferred light can be extracted and shaped to provide desired illumination of a target area and (ii) coupling some of the emitted light into optical modifiers adjacent to the light emission location which direct the modified light toward one or more other target areas.

The disclosed technologies provide a desired spatial and spectral functionality in a space illuminated by the luminaires described herein. Embodiments of the described luminaires manipulate areas of illumination and respective intensity vectors within an illuminated environment to create a desired illumination distribution. The output of the light-emitting elements (LEEs) included in the described luminaires is harnessed to create a virtual light source with properties that can result in compact luminaires with a small physical footprint relative to the illuminated environment.

(i) Luminaire Module with One or More Optical Modifiers

Figure 1A:
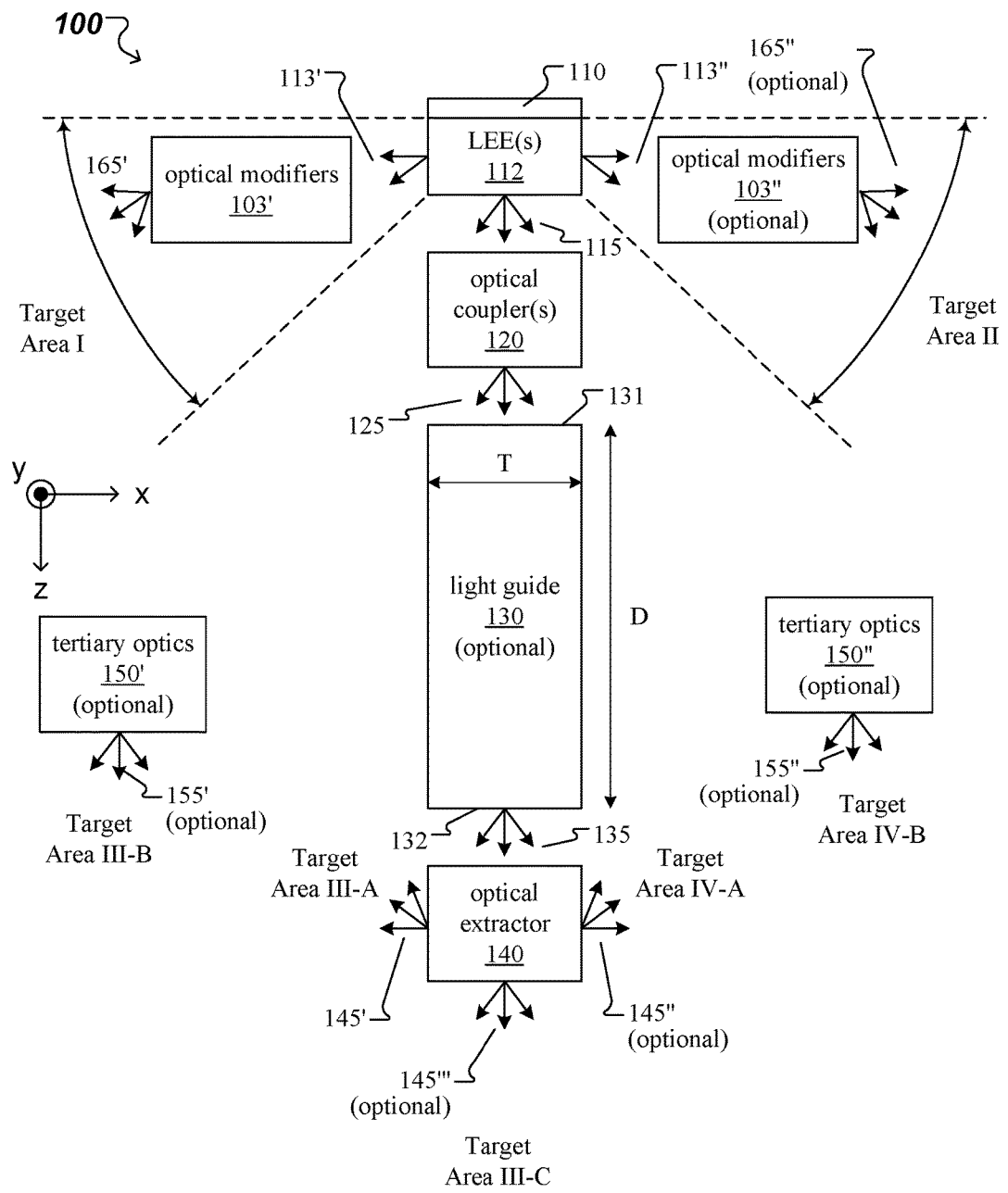
FIG. 1A is a schematic diagram of an example luminaire with an optical modifier.

FIG. 1A is a schematic diagram of an example luminaire 100 including LEEs 112 disposed on a substrate 110, optical extractor 140, and an optical modifier 103'. The example luminaire 100 further includes optical coupler(s) 120 coupled with the LEEs 112. Depending on the embodiment, optical couplers may be omitted from other example luminaires. The substrate 110 can provide any combination of thermal, structural, or electrical function for LEEs 112. A Cartesian coordinate system is shown in FIG. 1A for reference. The LEEs 112 emit light in an emission angular range that can be split into light emission fractions 115, 113', and optionally 113". Each of the emission fractions represents a zonal angular range. The sum of the light emission fractions 115, 113' (and optionally 113") can equal the total angular range of the LEEs 112. As used herein, providing light in an "angular range" refers to providing light that propagates in one or more prevalent directions in which each has a divergence with respect to the corresponding prevalent direction. In this context, the term "prevalent direction of propagation" can refer to a direction along which a portion of an intensity distribution of the propagating light has a maximum, a mean or a median, for example. For example, the prevalent direction of propagation associated with the angular range can be an orientation of a lobe of the intensity distribution. (See, e.g., FIGS. 1B and 1C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

Luminaire 100 includes optical modifier 103', and optionally optical modifier 103", that receive the light emission fraction 113', and 113" respectively, and output the received light emission fractions with an angular range 165', and 165" respectively, towards corresponding target areas I and II. In some implementations, the optical modifiers 103', 103" have reflective surfaces (e.g., specular reflective or diffusive reflective) that are shaped to output the received light emission fractions with angular ranges 165', 165". In some implementations, optical modifiers 103', 103" include a solid material (e.g., glass or a transparent plastic, such as polycarbonate or acrylic) and the received light emission fractions are reflected via total internal reflection (TIR).

Light emission fraction 115 represents an angular range along the z-axis of the luminaire 100. Optical coupler(s) 120 receives the light emission fraction 115. The optical coupler(s) 120 includes one or more solid pieces of transparent material (e.g., glass or a transparent plastic, such as polycarbonate or acrylic) having surfaces that are positioned to reflect the received light emission fraction 115 and output light with an angular range 125. In some implementations, the surfaces of the optical coupler(s) 120 are shaped to collect and collimate the received light emission fraction 115.

The luminaire 100 can optionally include a light guide 130. In such implementations, an exit aperture of the optical coupler(s) 120 and an adjacent light input surface 131 of the light guide 130 are optically coupled. The light with angular range 125 coupled into the light guide 130 from the optical coupler(s) 120 reflects off the surfaces of the light guide 130 and mixes within the light guide 130. The mixing can help achieve illuminance and/or color uniformity at a light exit aperture 132 of the light guide 130. Depth D of the light guide 130 can be selected to achieve adequate uniformity at the light exit aperture 132 of the light guide 130. The mixed light is output through the light exit aperture 132 with angular range 135 and received by optical extractor 140 that is optically coupled with the light guide 130.

In some implementations with optical coupler(s) 120 but without optional light guide 130, the light that is output by the optical coupler(s) 120 in angular range 125 can expand in open space until at least a portion of the light is received by optical extractor 140. Such implementations can be advantageous when a distance between the optical coupler(s) and the optical extractor is small or when expansion of the light in open space, which is governed by the angular range 125 and the distance between the optical coupler(s) and the optical extractor, is desirable to exhibit a lower flux density at the input to the optical extractor 140.

The optical extractor 140 includes redirecting surface(s) that redirect at least a portion of the light received at the optical extractor 140 towards one or more light output surfaces of the optical extractor 140. The optical extractor 140 outputs the redirected light through the one or more light output surfaces in angular range 145' towards target area III-A, and optionally in angular range 145" towards target area IV-A. The angular ranges 145', 145" can be symmetric or asymmetric and can be modified to have wider or narrower light distributions and peak intensity directions.

In some implementations, the redirecting surface(s) can include portions that are transparent to the light received at the optical extractor 140 (e.g., uncoated areas or discontinuities in the redirecting surfaces.) As such, a portion of the light received at the optical extractor can be output in angular range 145''' towards target area III-C along the forward direction (e.g., the z-axis).

In some implementations, the luminaire 100 can include tertiary optics 150' and/or 150". The tertiary optics 150', 150" can intercept at least a portion of the light that is output by the optical extractor in the angular ranges 145', 145" and redirect the intercepted light into angular ranges 155' and/or 155" respectively towards corresponding target areas III-B and/or IV-B. The tertiary optics 150', 150" can be fabricated from a variety of optical materials, such as reflectors (diffuse, specular, specular/diffuse, perforated, etc.,) or optical films with diffuser structures embossed therein, Fresnel surfaces and any of a variety of materials which can modify the angular ranges 145', 145".

The example luminaire 100 shows how light flux from LEEs 112 can be split into several light angular zones at both, the light source and at a distal optical extractor element such that zonal light portions can be guided and redirected to create multiple light exit angular ranges from the luminaire to illuminate a target space. Furthermore, the luminous properties of the various optical components can be arranged such that both, luminance and luminous intensity distribution, can be adjusted to suit the illumination needs and viewing angles of various lighting applications.

The luminaire 100 can be elongated along the y axis with a plurality of LEE's or rotationally symmetric about an optical axis along the z-axis. The luminaire 100 can also exhibit asymmetry in either, or both, the x and y directions.

In implementations where the luminaire 100 is elongated along the y-axis, the light emission fractions 115 and 113' (and optionally 113") can be elongated along the y-axis. In implementations where the luminaire 100 is rotationally symmetric about an optical axis of the luminaire, the light emission fraction 113' sweeps in an annular arc around the optical axis of the luminaire. The annular arc can be discontinuous such that light output from the luminaire can be directed towards corresponding target areas around the luminaire. Such embodiments can provide an illumination distribution that is different in a longitudinal direction (e.g., along a hallway) than in an orthogonal direction. Thus, the incident LEE radiation can be broken into at least two angular zones, with each zone potentially offering different optical paths and processes to modify the final radiation pattern and luminance distribution.

Figure 1B:
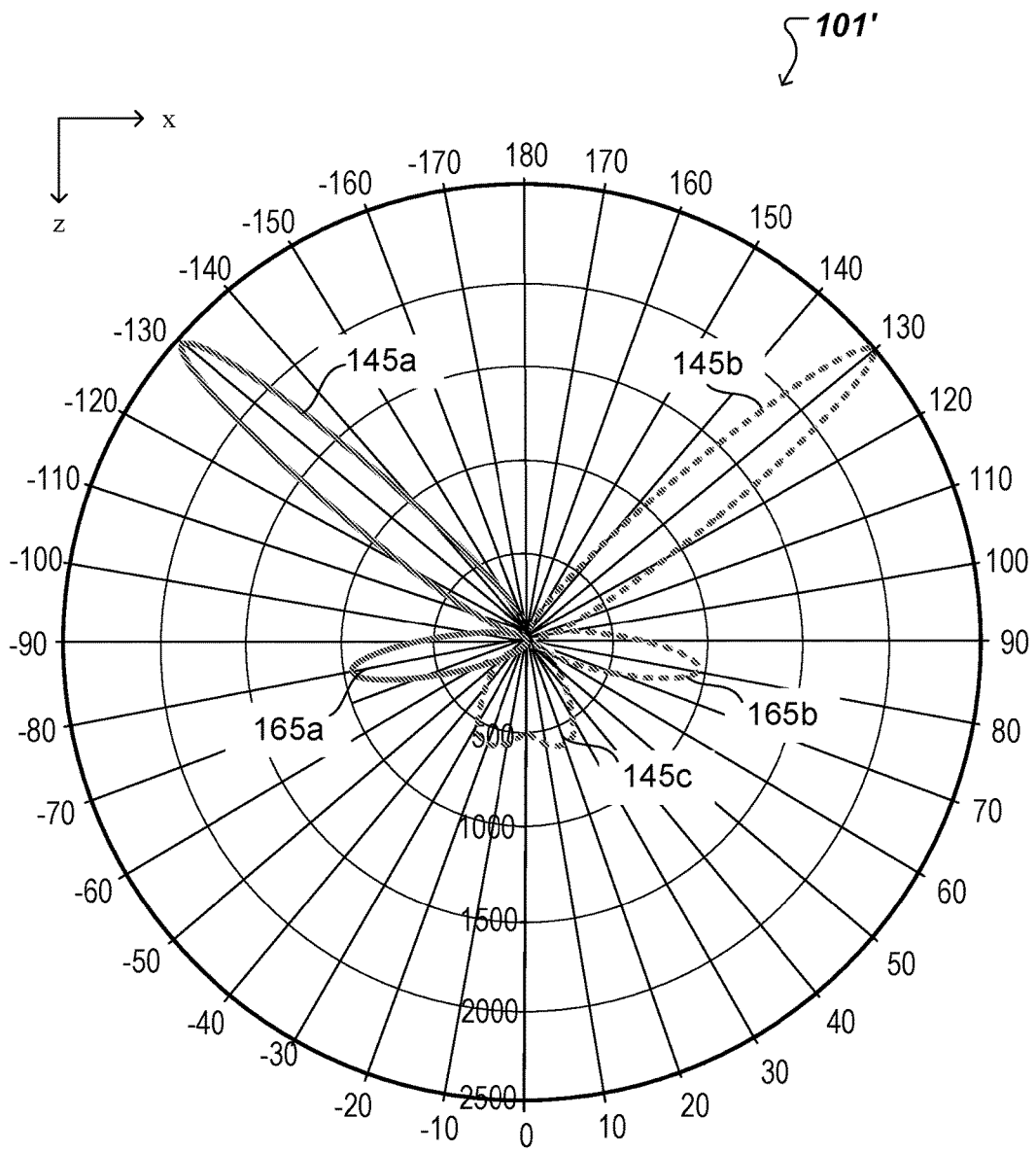
FIG. 1B is a polar plot of an example of an intensity profile of a luminaire including an optical modifier.

FIG. 1B shows, for the x-z plane, an example light intensity profile 101' of luminaire 100 configured with an optical modifier. The intensity profile 101' includes lobes, 145a, 145b, 165a, 165b, and 145c. In this example, lobe 145a corresponds to light that is output by optical extractor 140 in angular range 145', and lobe 165a corresponds to light that is output by optical modifier 103' in angular range 165'. Lobes 145b, 165b, and 145c correspond to optional configurations of luminaire 100. For example, lobe 145b corresponds to light that is output by optical extractor 140 in angular range 145", lobe 165b corresponds to light that is output by optical modifier 103" in angular range 165", and lobe 145c corresponds to light that is output by optical extractor 140 in angular range 145'''.

Here, the luminaire is configured to direct substantially all of the indirect (background) light represented by lobes 145a, 145b that is output by optical extractor 140 into a range of polar angles between −110° and −150°, and between +110° and +150° in a cross-sectional plane (x-z) of the luminaire. The luminaire is further configured to direct the forward light represented by lobes 165a, 165b that is output by optical modifiers 103', 103" into a range of polar angles between −70° and −105°, and between +70° and +105° in the cross-sectional plane (x-z) of the luminaire. Optionally, the luminaire can also be configured to direct the forward light represented by lobe 145c that is output by optical extractor 140 (e.g., direct light) into a range of polar angles between −40° and +40° in the cross-sectional plane (x-z) of the luminaire.

Figure 1C:
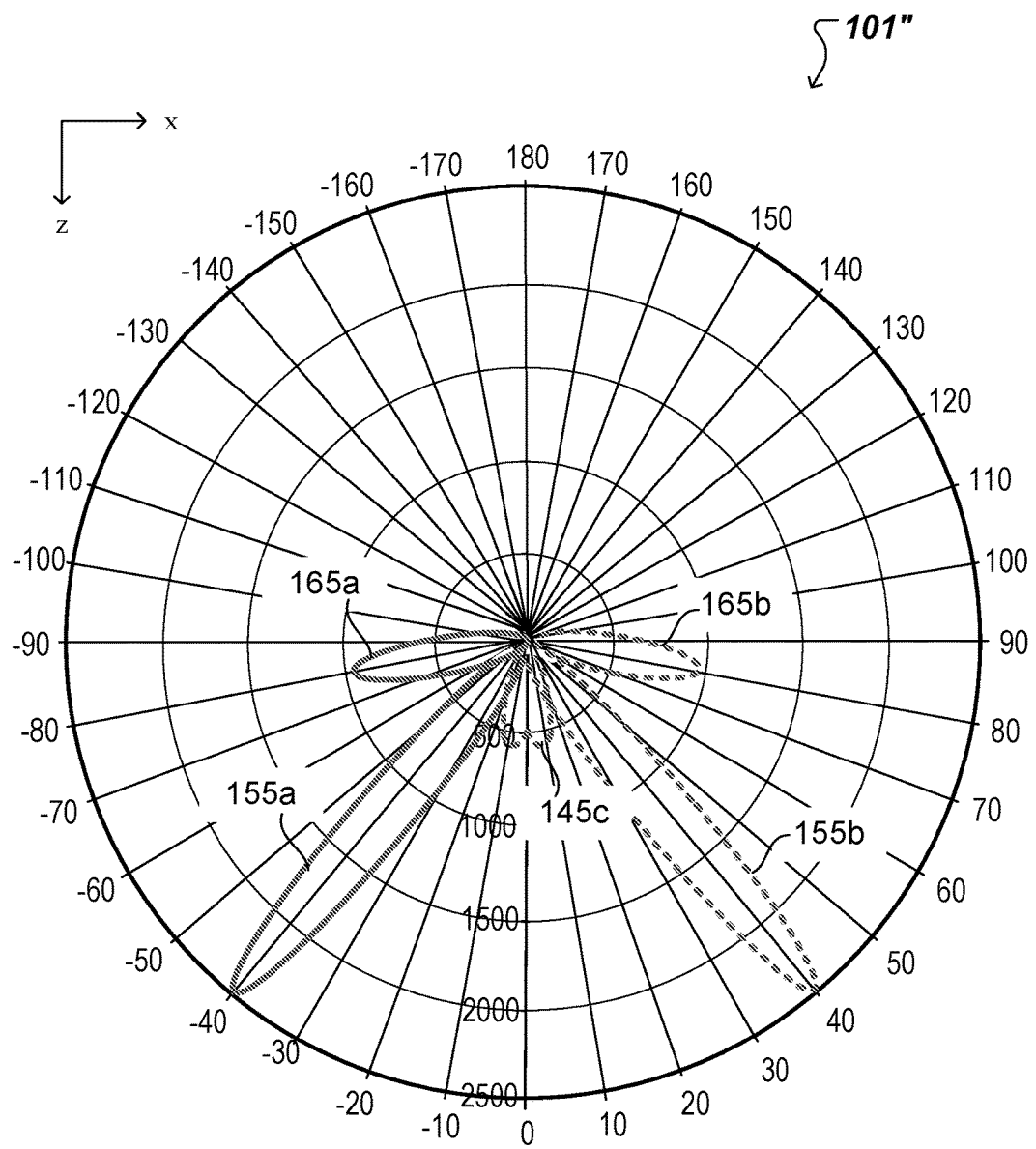
FIG. 1C is a polar plot of an example of an intensity profile of a luminaire including an optical modifier and tertiary optics.

FIG. 1C shows another example light intensity profile 101" of luminaire 100 configured with an optical modifier and a tertiary optic. Here, the intensity profile 101" includes lobes 165a and 155a, and optionally 165b, 155b, and 145c. In this example, lobe 165a corresponds to light that is output by optical modifier 103' in angular range 165', and lobe 155a corresponds to light that is redirected by tertiary optics 150' in angular range 155'. Lobes 165b, 155b, and 145c correspond to optional configurations of luminaire 100. For example, lobe 165b corresponds to light that is output by optical modifier 103" in angular range 165", lobe 155*b* corresponds to light that is redirected by tertiary optics 150" in angular range 155", and lobe 145*c* corresponds to light that is output by optical extractor 140 in angular range 145'".

Here, the luminaire is configured to direct substantially all of the light that is output by the luminaire in the forward direction.

In some implementations, maximum intensity of light emitting in the forward direction (e.g., lobes 155*a*, 155*b*, 165*a*, 165*b*, or lobe 145*c*) may be within a range between about −90° and about +90°.

As described in detail below, composition and geometry of components of the luminaire affect the light intensity profile and may be selected to provide direct and indirect illumination into ranges having varying angular width and direction.

(ii) Luminaire Module

Figure 2A:
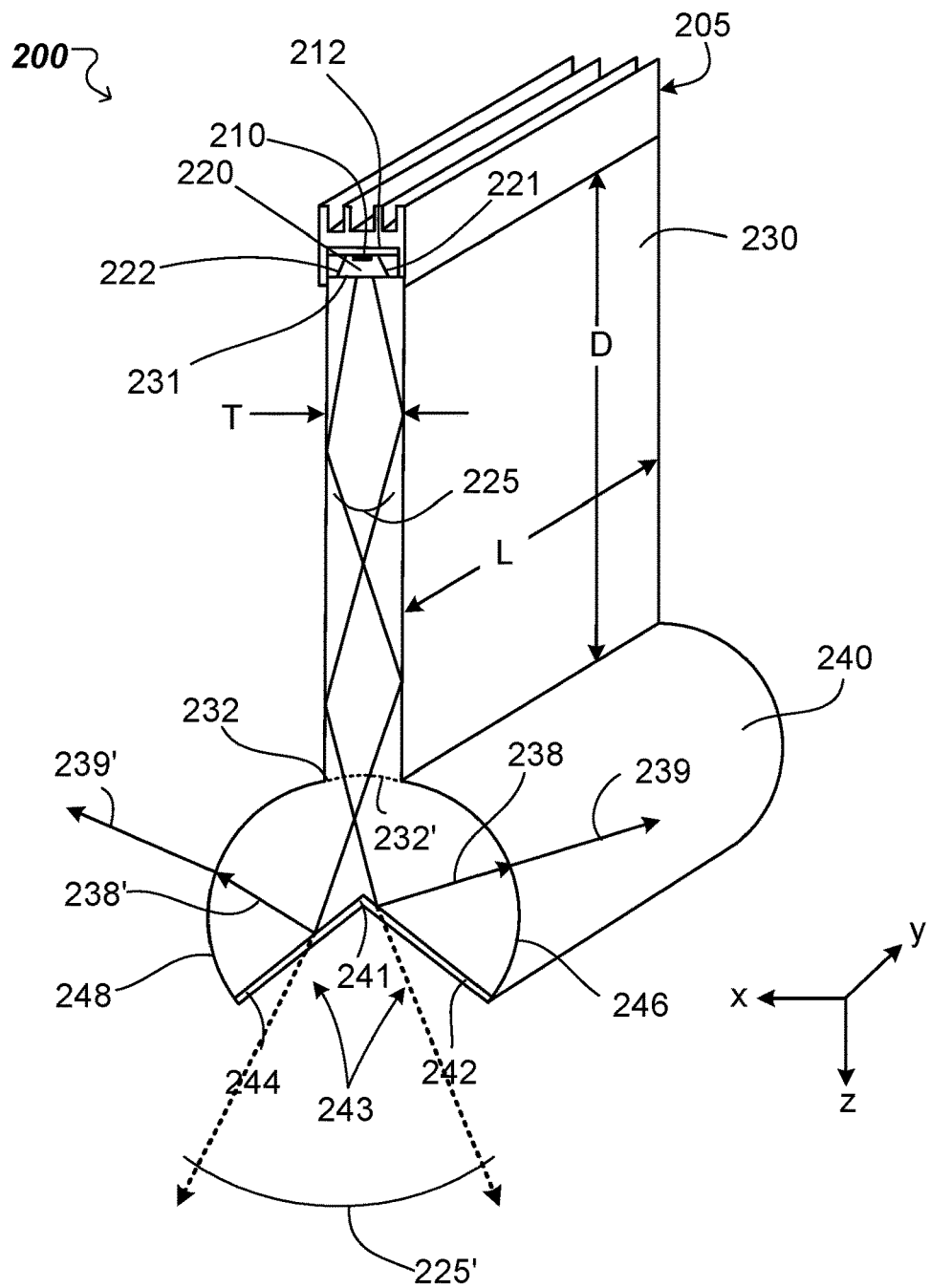
FIG. 2A is a perspective view of an example of an elongated luminaire module with a light guide and a bidirectional optical extractor.

Referring to FIG. 2A, in which a Cartesian coordinate system is shown for reference, an embodiment of a luminaire module 200 includes a substrate 212 having a plurality of LEEs 210 distributed along the substrate 212. The LEEs 210 are disposed at an upper edge 231 of a light guide 230. As shorthand, the positive z-direction is referred to herein as the "forward" direction and the negative z-direction is the "backward" direction. Sections through the luminaire parallel to the x-z plane are referred to as the "cross-section" or "cross-sectional plane" of the luminaire module. Also, luminaire module 200 extends along the y-direction, so this direction is referred to as the "longitudinal" direction of the luminaire module. Lastly, embodiments of luminaire modules can have a plane of symmetry parallel to the y-z plane, be curved or otherwise shaped. Depending on the embodiment, one or more components of the luminaire module can be invariant or variant under translation along the y-axis. This is referred to as the "symmetry plane" of the luminaire module.

Multiple LEEs 210 are disposed on the substrate 212, although only one of the multiple LEEs 210 is shown in FIG. 2A. For example, the plurality of LEEs 210 can include multiple white LEDs. An optical extractor 240 is disposed at lower edge of light guide 232. The LEEs 210 are coupled with one or more optical couplers 220 (only one of which is shown in FIG. 2A).

Substrate 212, light guide 230, and optical extractor 240 extend a length L along the y-direction. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, 150 cm or more).

The number of LEEs 210 on the substrate 212 will generally depend, inter alia, on the length L, where more LEEs are used for longer luminaires. In some embodiments, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and luminance desired from the luminaire module. For example, a relatively high density of LEEs can be used in applications where high luminance is desired or where low power LEEs are used. In some embodiments, the luminaire module has an LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In embodiments, LEEs can be evenly spaced along the length, L, of the luminaire. In some implementations, a heat-sink 205 can be attached to the substrate 210 to extract heat emitted by the plurality of LEEs 210. The heat-sink 205 can be disposed on a surface of the substrate 212 opposing the side of the substrate 212 on which the LEEs 210 are disposed.

Optical coupler 220 includes one or more solid pieces of transparent material (e.g., transparent glass or plastic, such as polycarbonate or acrylic) having surfaces 221 and 222 positioned to reflect light from the LEEs 210 towards light guide 230. In general, surfaces 221 and 222 are shaped to collect and collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some embodiments, surfaces 221 and 222 are coated with a highly reflective material (e.g., a reflective metal, such as aluminum), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 and the adjacent upper edge of light guide 231 are optically coupled. For example, the surfaces of a solid optical coupler and a solid light guide can be attached using a material that substantially matches the refractive index of the material forming the optical coupler 220 or light guide 230 or both. The optical coupler 220 can be affixed to light guide 230 using an index matching fluid, grease, or adhesive. In some embodiments, optical coupler 220 is fused to light guide 230 or they are integrally formed from a single piece of material.

Light guide 230 is formed from a piece of transparent material (e.g., glass or a transparent plastic, such as polycarbonate or acrylic) that can be the same or different from the material forming optical couplers 220. Light guide 230 extends length L in the y-direction, has a thickness uniform T in the x-direction, and a uniform depth D in the z-direction. The dimensions D and T are generally selected based on the desired optical properties of the light guide. During operation, light coupled into the light guide from optical coupler 220 (depicted by angular range 225) reflects off the planar surfaces of the light guide by TIR and mixes within the light guide. The mixing can help achieve luminance and/or color uniformity at the distal portion of the light guide 232 at optical extractor 240. The depth, D, of light guide 230 can be selected to achieve adequate uniformity at the exit aperture (i.e., at end 232) of the light guide. In some embodiments, D is in a range from about 1 cm to about 20 cm (e.g., 2 cm or more, 4 cm or more, 6 cm or more, 8 cm or more, 10 cm or more, 12 cm or more).

In some implementations, the surfaces of the light guide can include optical structures (e.g., scattering centers) or surface imperfections that can cause light to escape through the surface of the light guide, for example, to create a soft glow.

In general, optical couplers 220 are designed to restrict the angular range of light entering the light guide 230 (e.g., to within +/−40 degrees) so that at least a substantial amount of the light is coupled into spatial modes in the light guide 230 that undergoes TIR at the planar surfaces. In the illustrated example implementation, light guide 230 has a uniform thickness T, which is the distance separating two planar opposing surfaces of the light guide. Generally, T is sufficiently large so the light guide has an aperture at upper surface 231 sufficiently large to approximately match (or exceed) the exit aperture of optical coupler 220. In some embodiments, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the embodiment, the narrower the light guide the better it may mix light. A narrow light guide also provides a narrow exit aperture. As such light emitted from the light guide can be considered to resemble the light emitted from a one-dimensional linear light source, also referred to as an elongate virtual filament.

As discussed previously, length L corresponds to the length of the luminaire and can vary as desired.

While optical coupler 220 and light guide 230 are formed from solid pieces of transparent material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent material (e.g., glass or a transparent plastic, such as polycarbonate or acrylic) that can be the same as or different from the material forming light guide 230. The optical extractor 240 includes surfaces 242 and 244 and curved surfaces 246 and 248. The surfaces 242 and 244 represent first and second portions of a redirecting surface 243, while the curved surfaces 246 and 248 represent first and second output surfaces of the luminaire module 200.

Surfaces 242 and 244 of luminaire module 200 can be flat and coated with a reflective material (e.g., a highly reflective metal, such as aluminum or silver) over which a protective coating may be disposed. Furthermore, a material with reflectivity properties that can be controlled during operation, for example an electrochromic, electrowetting, liquid crystal or other mirror layer, may be employed. Thus, surfaces 242 and 244 provide a highly reflective optical interface for light entering an input end 232' of the optical extractor 240 from light guide 230. As another example, the surfaces 242 and 244 can include portions that are transparent to the light entering the optical extractor 240 at the input end 232'. Here, these portions can be uncoated regions (e.g., partially silvered regions) or discontinuities (e.g., slots, slits, apertures) of the surfaces 242 and 244. As such, some light can be transmitted in the forward direction (along the z-axis) through surfaces 242 and 244 of the optical extractor 240 in an output angular range 225'. In some cases, the light transmitted in the output angular range 225' is refracted. In this way, the redirecting surface 243 acts as a beam splitter rather than a mirror, and transmits in the output angular range 225' a desired portion of incident light, while reflecting the remaining light in angular ranges 238 and 238'.

In the x-z cross-sectional plane, the lines corresponding to surfaces 242 and 244 have the same length and form a v-shape that meets at a vertex 241. In general, the included angle of the v-shape can vary as desired. For example, in some embodiments, the included angle can be relatively small (e.g., from 30° to 60°). In some embodiments, the included angle is in a range from 60° to 120° (e.g., about 90°). The included angle can also be relatively large (e.g., in a range from 120° to 150° or more). In the example implementation shown in FIG. 2A, the output surfaces 246 and 248 of the optical extractor 240 are curved with a constant radius of curvature that is the same for both. Accordingly, luminaire module 200 has a plane of symmetry intersecting vertex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some embodiments, optical extractor 240 is fused to light guide 230 or they are integrally formed from a single piece of material.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire. The first portion of the redirecting surface 242 provides light having an angular distribution 238 towards the output surface 246, the second portion of the redirecting surface 244 provides light having an angular distribution 238' towards the output surface 246. The light exits optical extractor 240 through output surfaces 246 and 248. In general, the output surfaces 246 and 248 have optical power, to redirect the light exiting the optical extractor 240 in angular ranges 239 and 239', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in directions that are within a certain angle of the forward direction (i.e., in certain angular ranges relative to the positive z-direction). In embodiments where the luminaire module 200 is attached to a ceiling so that the forward direction is towards the floor, such configurations can help avoid glare and an appearance of non-uniform illuminance.

In general, the intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the illumination.

In some implementations, the orientation of the illumination can be adjusted based on the included angle of the v-shaped groove 241 formed by the portions of the redirecting surface 242 and 244. In this manner, light can be extracted from the luminaire module 200 in a more forward direction for the smaller of two included angles formed by the portions of the redirecting surface 242, 244.

Furthermore, while surfaces 242 and 244 are depicted as planar surfaces, other shapes are also possible. For example, these surfaces can be curved or faceted. Curved redirecting surfaces 242 and 244 can be used to narrow or widen the beam. Depending on the divergence of the angular range of the light that is received at the input end 232' of the optical extractor 240, concave reflective surfaces 242, 244 can narrow the illumination output by the optical extractor 240, while convex reflective surfaces 242, 244 can widen the illumination output by the optical extractor 240. As such, suitably configured redirecting surfaces 242, 244 may introduce convergence or divergence into the light. Such surfaces can have a constant radius of curvature, can be parabolic, hyperbolic, or have some other curvature.

Figure 2B:
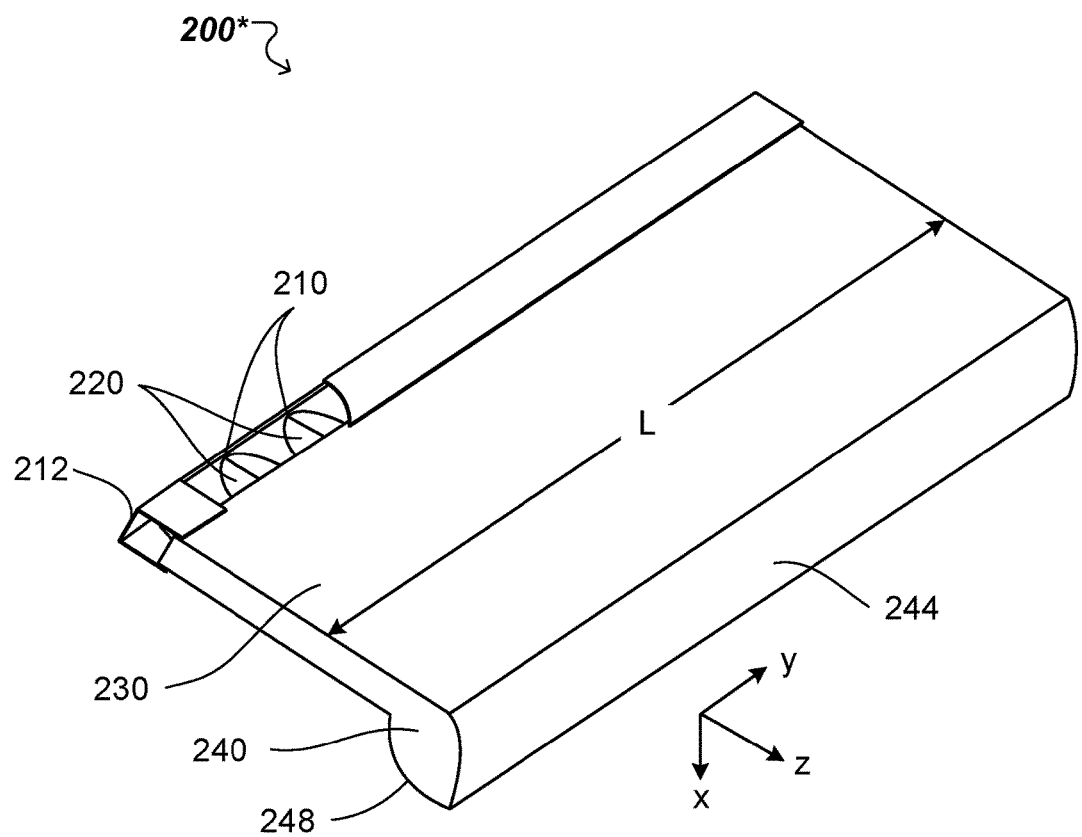
FIG. 2B is a perspective view of an example of an elongated luminaire module with a unidirectional optical extractor.

While the luminaire module 200 as described in FIG. 2A includes an optical extractor 240 with two light output surfaces 246 and 248, a luminaire module can also be configured with one light output surface. FIG. 2B shows an example of luminaire module 200* that is designed to output light in the positive x-direction, but not in the negative x-direction. Luminaire module 200* includes substrate 212, LEEs 210 (e.g., 4, 6, 10, 20, or more) disposed on substrate 212 that are configured to emit light in an emission angular range, and optical couplers 220 coupled with corresponding LEEs. Optical couplers 220 are arranged and configured to redirect (or collimate) the light received from the LEEs into an angular range with a divergence smaller than the divergence of the emission angular range at least in the x-z cross-section.

Luminaire module 200* also includes a light guide 230 and an optical extractor 240. The light guide 230 is optically coupled at a light input surface with the optical couplers 220 and configured to receive light from the optical couplers 220. Light guide 230 guide the received light to a light output surface of the light guide 230. The optical extractor 240 is coupled with the light output surface of the light guide 230 and configured to receive the light that is output by light guide 230.

Optical extractor 240 includes a reflective optical interface 244 and a light exit surface 248. In cross-section, both reflective optical interface 244 and light exit surface 248 are convex (as viewed in the direction of propagation of light) in shape. Light exit surface 248 can have a constant radius of curvature while the radius of curvature of the reflective optical interface 244 can vary. During operation, optical couplers 220 collimate light from LEEs 210 and direct the light to light guide 230. The light propagates down light guide 230 to optical extractor 240, and is, at least in part, redirected by the reflective optical interface 244 and is output through the light exit surface 248. A light intensity profile of luminaire module 200* can be similar to output lobe 145a shown in FIG. 1B.

FIG. 2C shows an embodiment 200' of the disclosed luminaire module that is elongated along an axis (e.g., y-axis) perpendicular to the forward direction (e.g., along the z-axis.) In this case, a length L of the light guide 230 along the elongate dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05 D, 0.1 D or 0.2 D, for instance, light from multiple, point-like LEEs 210—distributed along the elongated dimension L—that is edge-coupled into the light guide 230 at the receiving end can efficiently mix by the time it propagates to the opposing end.

FIG. 2D shows an embodiment 200" of the disclosed luminaire module that has a (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05 D, 0.1 D or 0.2 D, for instance.

Other shapes of the disclosed luminaire module are possible. FIGS. 2E and 2F show a perspective view and a bottom view, respectively, of an embodiment 200''' of the disclosed luminaire module for which the light guide 230 has two opposing side surfaces 232a, 232b that form a closed cylinder shell of thickness T. In the example illustrated in FIGS. 2E and 2F, the x-y cross-section of the cylinder shell formed by the opposing side surfaces 232a, 232b is oval. In other cases, the x-y cross-section of the cylinder shell can be circular or can have other shapes. Some implementations of the example luminaire module 200' may include a specular reflective coating on the side surface 232a of the light guide 230. Open curved shapes are possible.

Figure 2G:
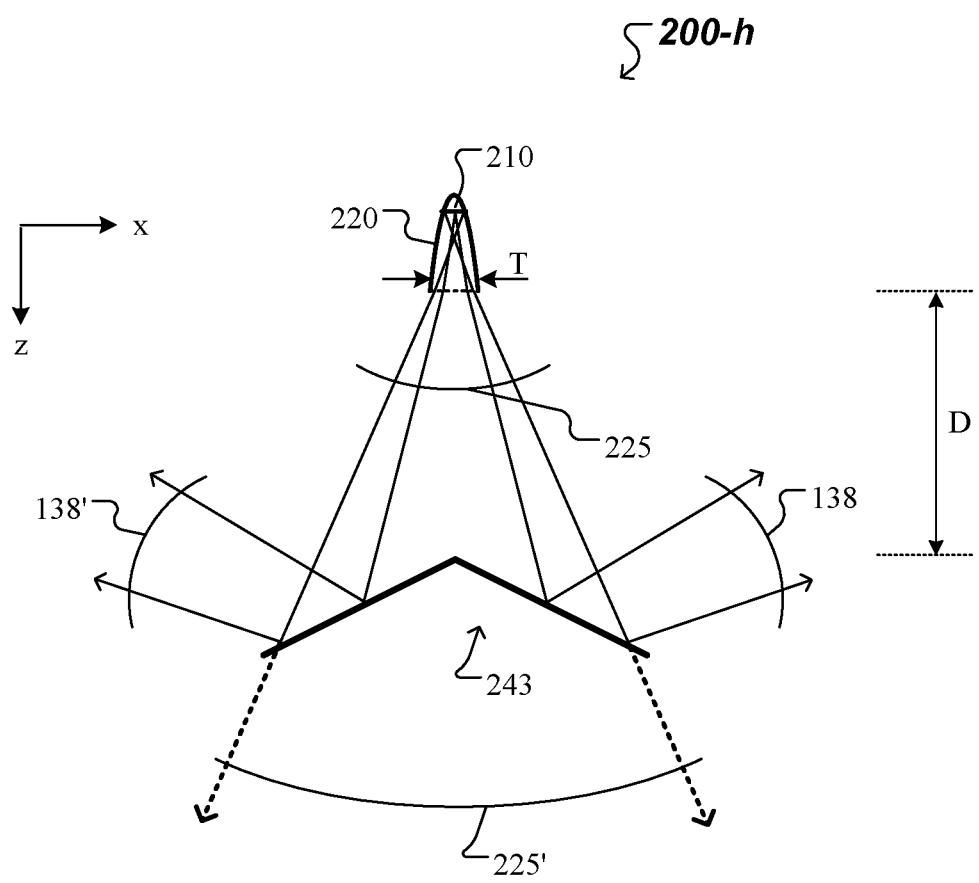
FIG. 2G is a sectional view of an example of a hollow luminaire module.

In the example implementations described above in connection with FIG. 2A, the luminaire module 200 includes a light guide 230 to guide (translate) light from the exit aperture of the optical couplers 220 to the input end 231 of the optical extractor 240. FIG. 2G shows an example of a "hollow" luminaire module 200-h that includes LEEs 210, one or more corresponding optical couplers 220 (like the luminaire module 200) and an optical extractor (simplified relative to the optical extractor 240 of the luminaire module 200) that uses only a redirecting surface 243 to extract—to the ambient environment—the light provided by the optical couplers 220. The hollow luminaire module 200-h is elongated along the y-axis like the luminaire module 200 shown in FIG. 2A. Also like the luminaire module 200, the hollow luminaire module 200-h includes a mount 212 (having a normal along the z-axis) such that the LEEs 210 are disposed on a surface of the mount 212 along the y-axis to emit light in a first angular range along the z-axis. The optical couplers 220 are arranged and configured to redirect the light emitted by the LEEs 210 in the first angular range into a second angular range 225 that has a divergence smaller than the divergence of the first angular range at least in the x-z cross-section.

Here, the redirecting surface 243 is spaced apart from an exit aperture of the optical couplers 220 by a distance D and includes two reflecting surfaces arranged to form a v-groove with an apex pointing toward the optical couplers 220. The distance D is selected based on a divergence of the second angular range 225 and of a transverse dimension (along the x-axis) of the redirecting surface 243, such that all light provided by the optical couplers in the second angular range 225 impinges on the redirecting surface 243. In this manner, a portion of the redirecting surface 243 redirects some of the light received from the optical couplers 220 into a third angular range 138' and another portion of the redirecting surface 243 redirects the remaining light received from the optical couplers 220 into a fourth angular range 138.

In some cases, the redirecting surface 243 is semitransparent. In this manner, a fraction of the light received from the optical couplers 220 in the second angular range 225 is transmitted (leaks) through the redirecting surface 243 in a fifth angular range 225'. A prevalent propagation direction for the fifth angular range 225' is in the forward direction (along the z-axis.) A light intensity profile of the hollow luminaire module 200-h can be represented similar to the one shown in FIG. 1B as first 145a and second 145b output lobes, and optionally as an additional third output lobe 145c. By comparison, the first output lobe 145a corresponds to light output by the hollow luminaire module 200-h in the third angular range 138', the second output lobe 145b corresponds to light output by the hollow luminaire module 200-h in the fourth angular range 138, and the third output lobe 145c corresponds to light output by the hollow luminaire module 200-h in the fifth angular range 225'.

Luminaire modules, such as luminaire modules 200, 200*, 200', 200", 200''', and 200-h as described above with respect to FIGS. 2A-2G, can be used in conjunction with optical components, such as optical modifiers and tertiary optics, to create a luminaire, such as luminaire 100 as described with respect to FIG. 1A. For instance, any of the luminaire modules 200, 200*, 200', 200'', 200''', and 200-h can be used to receive light emitted by the LEEs 112 in the angular range portion 115 and to redirect the received light into various zones, e.g., into target area III-A, or, optionally, into target areas IV-A or III-C.

(iii) First Implementation of Luminaire Module with Optical Modifiers

Figure 3A:
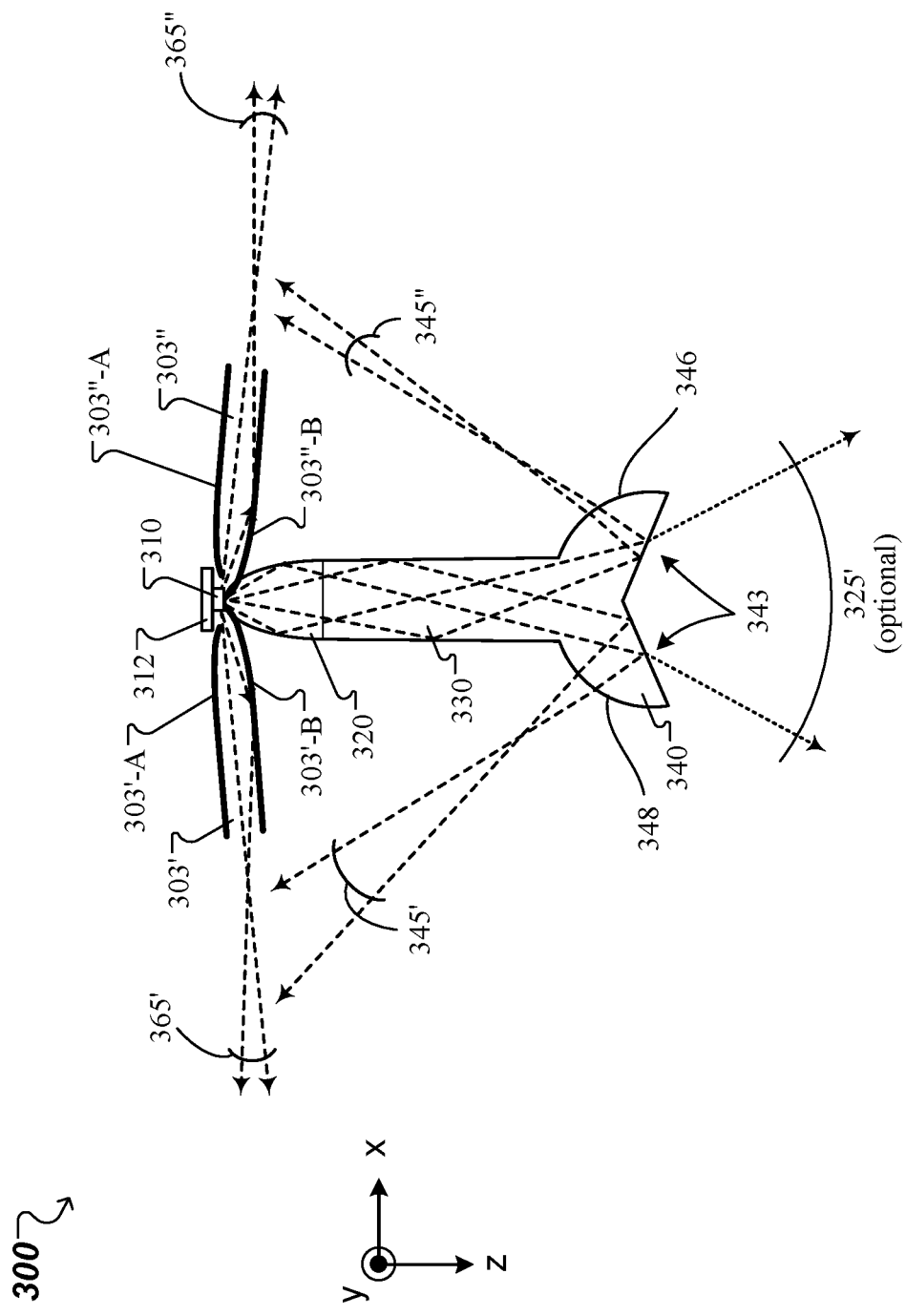
FIGS. 3A-3C show examples of luminaires with optical modifiers.

FIG. 3A shows an example of a luminaire 300 with optical modifiers 303' and 303''. Luminaire 300 has an elongate extension in y-direction and includes LEEs 310 disposed on a substrate 312, optical couplers 320 coupled with corresponding LEEs 310, and optical extractor 340. The LEEs 310 emit light in an emission angular range that is split into light emission fractions (or angular zones) by the arrangement of optical modifiers 303', 303'' and optical couplers 320. The optical modifiers 303', 303'' and optical couplers 320 receive corresponding light emission fractions. Optical modifiers 303', 303'' include reflective surfaces 303'-A, 303'-B, and 303''-A and 303''-B respectively, (e.g., specular or diffusive reflective) configured to redirect light received from the LEEs 310 towards output apertures of the respective optical modifiers. Optical modifier 303' receives a first light emission fraction of the emission angular range and outputs light with an angular range 365'. Here, a major component of the prevalent propagation direction of the light in the angular range 365' is in a first lateral direction, e.g., along the negative x-axis. In some cases, a minor component of the prevalent propagation direction of light in the angular range 365' is along the forward direction, e.g., along the positive z-axis. In other cases, the minor component of the prevalent propagation direction of light in the angular range 365' is along the backward direction, e.g., along the positive z-axis. Optical modifier 303'' receives a second light emission fraction of the emission angular range and outputs light with an angular range 365''. In this example, a major component of the prevalent propagation direction of the light in the angular range 365'' is in a second lateral direction opposing the first lateral direction, e.g., along the positive x-axis. In some cases, a minor component of the prevalent propagation direction of light in the angular range 365'' is along the forward direction, e.g., along the positive z-axis. In other cases, the minor component of the prevalent propagation direction of light in the angular range 365'' is along the backward direction, e.g., along the positive z-axis.

The optical modifiers 303', 303'' can be shaped to provide a desired illumination distribution (e.g., for broad area lighting.) The optical modifiers 303', 303'' can be shaped to direct a fraction of the light emitted by LEEs 310 in a variety of directions and in a variety of different beam luminous intensity profiles. For example, the surfaces 303'-A, 303'-B, 303''-A, 303''-B of optical modifiers 303', 303'' can initially extend along the x-axis and then sweep upward in the negative z direction (e.g., for ceiling illumination) or downward in the positive z direction (e.g., for broad area task illumination.)

Luminance properties of the luminaire can be altered depending on the field of view and a desired illumination distribution. In some implementations, optical modifiers 303', 303'' can be configured to spread the respective light output across a large area, thereby reducing surface luminance, for example for applications where luminous intensity should come from a location visible within a user's field of view (e.g., low ceiling work environments.)

The optical modifiers 303', 303'' can be permanently installed or adjustable (not illustrated). The optical modifiers 303', 303'' can be placed adjacent to LEEs 310 as shown in FIG. 3 or at any location at which optical modifiers 303', 303'' can receive a fraction of the emission angular range of LEEs 310.

Optical couplers 320 receive a third light emission fraction of the emission angular range. Optical couplers 320 are optically coupled with light guide 330 and configured to collimate the received third light emission fraction. Light guide 330 receives the light that is output by optical couplers 320 at a first end of the light guide and guides the received light towards an opposing end of the light guide 330. Optical extractor 340 is optically coupled with light guide 330 at the opposing end and receives the guided light.

Optical extractor 340 includes redirecting surfaces 343 that redirect at least a portion of the received light towards light output surfaces 346 and 348. In some implementations, redirecting surfaces 343 can include a reflector (e.g., a reflective coating) configured to reflect at least a portion of the light received at the optical extractor 340 towards light output surfaces 346, 348. In some implementations, redirecting surfaces are shaped to redirect at least a portion of the light received at the optical extractor 340 via total internal reflection (TIR). In some implementations, the redirecting surfaces 343 include portions that are transparent. Here, a portion of the light received at the optical extractor 340 is output in angular range 325' in which a prevalent propagation direction is the forward direction (e.g., the positive z-axis).

Optical extractor outputs the redirected light through light output surfaces 346, 348 in angular ranges 345' and 345'' respectively. Optical extractor can be shaped to provide light of a variety of angular ranges that can, for example, exhibit symmetric or asymmetric properties.

In some implementations, the light that is output from the optical extractor in angular ranges 345', 345'' can be further shaped or redirected. For example, at least a portion of angular ranges 345', 345'' can be reflected by optical modifiers 303', 303'' or additional tertiary optics can be implemented to redirect at least a portion of angular ranges 345', 345'' to create a desired illumination distribution as described in connection with the following implementations.

(iv) Second Implementation of Luminaire Module with Optical Modifiers

Figure 3B:
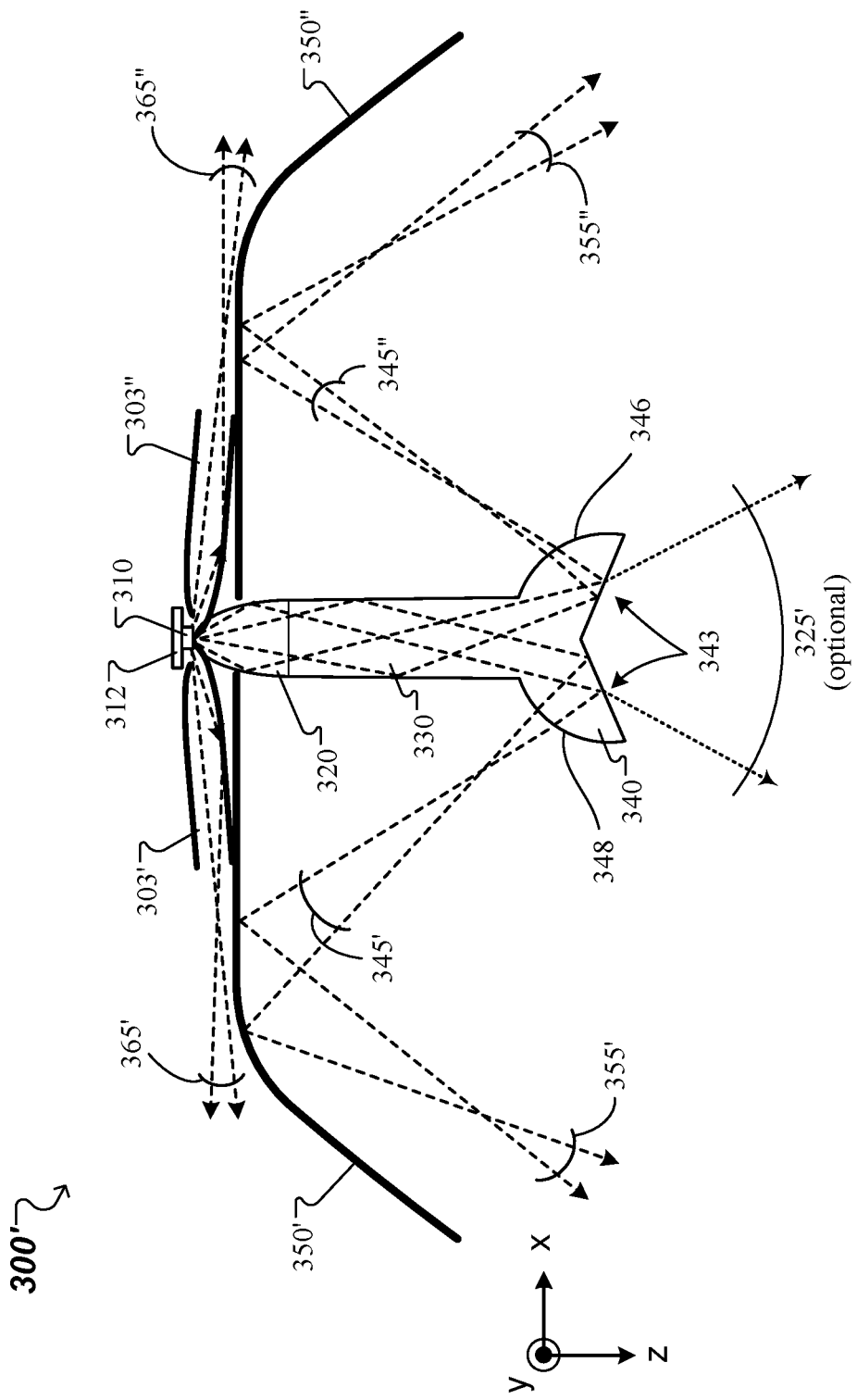

FIG. 3B shows an example luminaire 300' which is a modification of the luminaire 300 described above in connection with FIG. 3A. In addition to the optical modifiers 303', 303'' and the light guide luminaire module of the luminaire 300, the luminaire 300' includes tertiary optics 350', 350''. The tertiary optics 350', 350'' are arranged such that at least a portion of the light that is output by optical extractor 340 in angular ranges 345', 345'' is reflected by tertiary optics 350', 350'' in angular ranges 355' and 355'' respectively. In some implementations, top surfaces of the tertiary optics 350', 350'' adjacent the optical modifiers 303', 303'' may be configured to reflect a portion of the light that is output by optical modifiers 303', 303'' in angular ranges 365', 365''.

While optical modifiers 303' and 303'' in FIGS. 3A and 3B include both reflectors 303'-A, 303'-B and 303''-A, 303''-B, respectively, optical modifiers with other configurations are also possible.

In other example luminaires, one or more components or the whole luminaire may be configured to exhibit axial or other rotational symmetry, for example, about the z-axis or a toroidal configuration. Such example luminaires may share like sectional views as illustrated in FIG. 3A, 3B or 3C while including a single optical modifier extending around the luminaire or multiple respectively arranged optical modifiers, for example.

(v) Third Implementation of Luminaire Module with Optical Modifiers

Figure 3C:
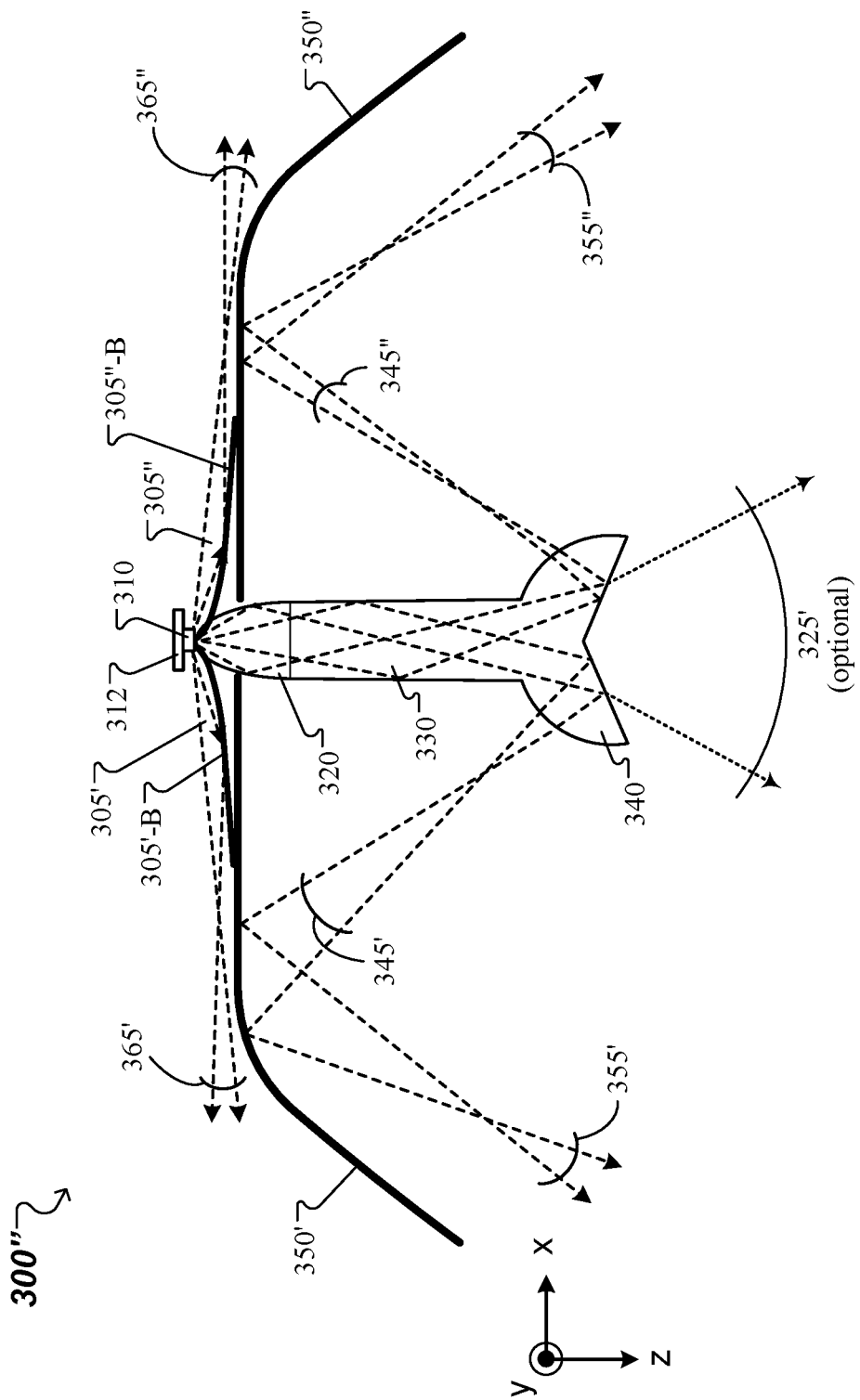

FIG. 3C shows an example of a luminaire 300" which is a modification of the luminaire 300' described above in connection with FIG. 3B. In addition to the light guide luminaire module and the tertiary optics 350', 350" of the luminaire 300', the luminaire 300" includes optical modifiers 305' and 305" that have reflective surfaces 305'-B and 305"-B, respectively. Light output by the optical modifiers 305' and 305" in angular ranges 365' and 365", respectively, propagates in opposing x-directions and can have components in the forward direction (z-direction), backward or both forward and backward direction.

Additionally, light that is output by optical extractor 340 in angular ranges 345', 345" impinges on the tertiary optics 350', 350" where it is reflected towards the forward direction with angular ranges 355' and 355", respectively.

What is claimed is:

1. A luminaire comprising:
    one or more luminaire modules, each module comprising:
        one or more light-emitting elements (LEEs) disposed on one or more substrates and adapted to emit light in an emission angular range;
        one or more optical couplers positioned to receive a portion of the light emitted by corresponding one or more LEEs in the emission angular range and adapted to at least partially collimate the received light within a forward angular range;
        a light guide having an input end and an output end, and planar side surfaces extending from the input end to the output end, the side surfaces being shaped to guide light received from the one or more optical couplers within the forward angular range at the input end of the light guide to the output end of the light guide; and
        an optical extractor adapted to receive the guided light from the output end of the light guide, the optical extractor having a first redirecting surface, the first redirecting surface of the optical extractor being adapted to reflect at least a portion of the guided light and provide redirected light in a first backward angular range opposing the forward angular range; and
    a first optical modifier adapted to receive a first fraction of the light that is emitted by the one or more LEEs in the emission angular range, the first optical modifier having one or more reflective surfaces shaped to output the received light along a first lateral angular range.

2. The luminaire of claim 1, further comprising a second optical modifier, wherein the second optical modifier is adapted to receive a second fraction of the light emitted by the one or more LEEs in the emission angular range, the second optical modifier having one or more reflective surfaces shaped to output the received light along a second lateral angular range opposing the first lateral angular range.

3. The luminaire of claim 2, wherein at least a portion of the one or more reflective surfaces of at least one of the first or second optical modifiers is specular reflective.

4. The luminaire of claim 2, wherein at least one of the first or second optical modifiers comprises a solid material, and at least a portion of the received light is reflected via TIR.

5. The luminaire of claim 1, further comprising a first tertiary optic having a first reflective surface configured to reflect at least a portion of light that is redirected by the optical extractor in the first backward angular range, the reflected light being provided at least in part within the forward angular range.

6. The luminaire of claim 5, wherein the first tertiary optic comprises a second reflective surface opposing the first reflective surface, the second reflective surface being configured to reflect at least a portion of the light output by the first optical modifier.

7. The luminaire of claim 6, wherein at least one of the first or second reflective surfaces of the first tertiary optic is diffuse reflective.

8. The luminaire of claim 6, wherein at least one of the first or second reflective surfaces of the first tertiary optic is specular reflective.

9. The luminaire of claim 6, wherein at least one of the first or second reflective surfaces of the first tertiary optic is perforated.

10. The luminaire of claim 6, wherein at least one of the first or second reflective surfaces of the first tertiary optic is semi-transparent.

11. The luminaire of claim 2, wherein the optical extractor comprises a second redirecting surface, the second redirecting surface of the optical extractor being adapted to reflect at least a portion of the light received at the optical extractor and provide redirected light in a second backward angular range, wherein the second backward angular range is on an opposite side of an optical axis of the light guide relative to the first backward angular range.

12. The luminaire of claim 11, further comprising a second tertiary optic having a first reflective surface configured to reflect at least a portion of light that is redirected by the optical extractor in the second backward angular range, the reflected light being provided at least in part within the forward angular range.

13. The luminaire of claim 12, wherein the second tertiary optic comprises a second reflective surface opposing the first reflective surface, the second reflective surface being configured to reflect at least a portion of the light output by the second optical modifier.

14. The luminaire of claim 13, wherein at least one of the first or second reflective surfaces of the second tertiary optic is diffuse reflective.

15. The luminaire of claim 13, wherein at least one of the first or second reflective surfaces of the second tertiary optic is specular reflective.

16. The luminaire of claim 13, wherein at least one of the first or second reflective surfaces of the second tertiary optic is perforated.

17. The luminaire of claim 13, wherein at least one of the first or second reflective surfaces of the second tertiary optic is semi-transparent.

18. The luminaire of claim 1, wherein the light guide comprises a solid transparent material and the side surfaces are configured to guide the light via TIR.

19. The luminaire of claim 1, wherein the light guide is hollow and the side surfaces are reflectors configured to guide the light via specular reflection.

* * * * *